United States Patent
Takayama et al.

(10) Patent No.: US 6,476,576 B2
(45) Date of Patent: Nov. 5, 2002

(54) MOTOR CONTROL APPARATUS

(75) Inventors: Seiryu Takayama, Kanagawa (JP); Junji Katsuta, Tokyo (JP); Reiichi Sato, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/870,643

(22) Filed: Jun. 1, 2001

(65) Prior Publication Data

US 2001/0050540 A1 Dec. 13, 2001

(30) Foreign Application Priority Data

Jun. 8, 2000 (JP) ............................ 2000-172382

(51) Int. Cl.⁷ ............................................ G05B 11/28
(52) U.S. Cl. ................ 318/599; 318/254; 318/138; 318/439; 369/47.36
(58) Field of Search ................. 318/254, 138, 318/599, 439; 369/47.36

(56) References Cited

U.S. PATENT DOCUMENTS

| | | | | |
|---|---|---|---|---|
| 5,041,768 A | * | 8/1991 | Herrmann | 318/138 |
| 5,365,153 A | * | 11/1994 | Fujita et al. | 318/34 |
| 5,481,166 A | * | 1/1996 | Moreira | 318/254 |
| 5,838,515 A | * | 11/1998 | Mortazavi et al. | 360/75 |
| 5,870,363 A | * | 2/1999 | Sun et al. | 369/47.45 |

* cited by examiner

*Primary Examiner*—Rita Leykin
(74) *Attorney, Agent, or Firm*—Rader, Fishman & Grauer PLLC; Ronald P. Kananen

(57) ABSTRACT

A motor control apparatus according to the present invention comprises: a servo circuit for outputting a pulse width modulation signal; a low-pass filter for receiving the pulse width modulation signal outputted by the servo circuit as an input; and a driver circuit for receiving an output voltage of the low-pass filter as an input and thereby driving a brushless sensorless motor; wherein the servo circuit controls pulse width of the pulse width modulation signal so as to maintain rotational speed of the motor at a target rotational speed on the basis of an FG pulse signal outputted by the motor, the FG pulse signal representing the rotational speed of the motor by frequency. The motor control apparatus further includes a rotational speed changing means, the rotational speed changing means changing the rotational speed of the motor by gradually varying a voltage outputted by the driver circuit from a current voltage to a target voltage on input of a control start signal.

6 Claims, 5 Drawing Sheets

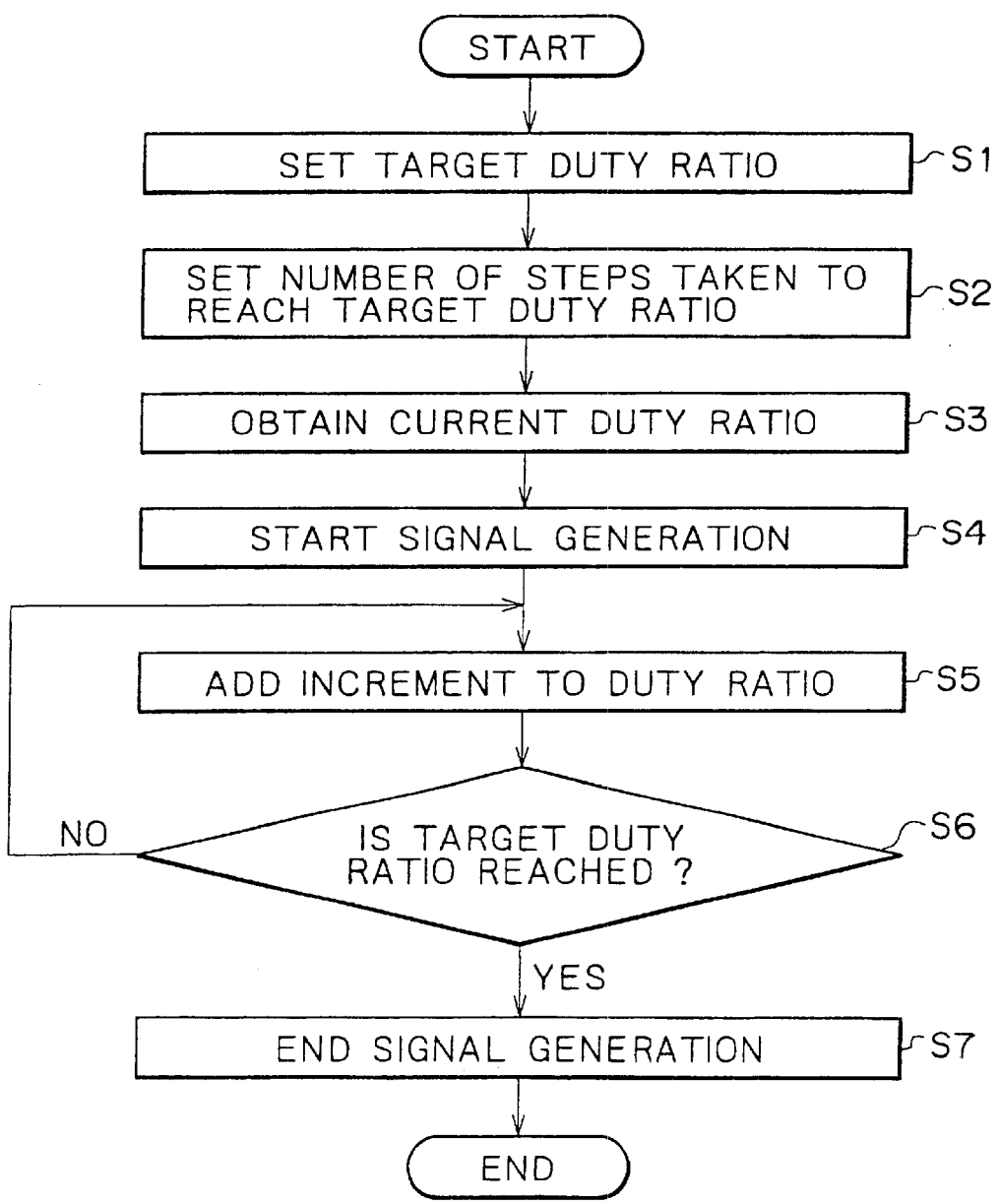

F I G. 6
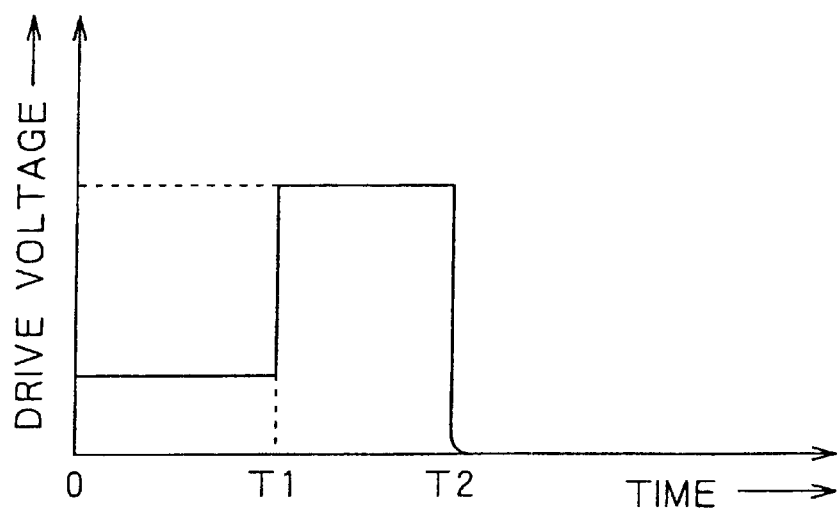
F I G. 7
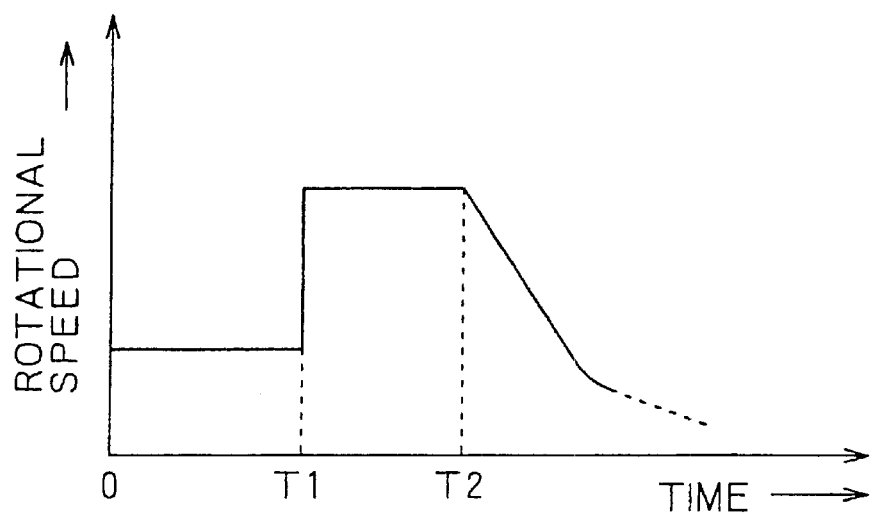

MOTOR CONTROL APPARATUS

BACKGROUND OF THE INVENTION

The present invention relates to an apparatus for controlling a motor, and particularly to an apparatus for controlling a brushless sensorless motor.

In order to reduce battery power consumption and lengthen continuous reproduction time of a portable MD (minidisk) system powered by a battery, for example, a motor for rotating an MD is controlled to rotate at high speed for fast access only when the MD is accessed to make recording and reproduction, and is otherwise controlled to rotate at low speed to reduce power consumption.

FIG. 6 is a waveform diagram showing change in drive voltage when rotational speed of the motor is to be changed. FIG. 7 is a waveform diagram showing change in the rotational speed of the motor when the drive voltage is changed in a manner as shown in FIG. 6. In this example, until a time T1, it is not necessary to access the MD, and therefore the drive voltage is held low and also the rotational speed is low. During a period from the time T1 to a time T2, the drive voltage is set high in order to access the MD, and thus the rotational speed is also high. After the time T2, the drive voltage is zero, and the motor rotates by inertia and gradually lowers its rotational speed.

It is advantageous from a viewpoint of cost and the like to use a brushless sensorless motor, which eliminates the need for a sensor such as a Hall device to detect the rotational speed, as the motor for driving and rotating the MD. The motor includes three coils, which form a three-phase coil, and on the basis of a pulse signal generated from one of the coils, an FG pulse signal that represents the rotational speed of the motor by frequency is generated.

However, in a case where the rotational speed of the brushless sensorless motor is changed to lengthen continuous reproduction time as described above, when the rotational speed is greatly changed in a short time, the FG pulse signal is not properly generated, and thereby servo control cannot be effected. This may render control of the motor impossible.

SUMMARY OF THE INVENTION

The present invention has been made to solve such problems, and it is accordingly an object of the present invention to provide a motor control apparatus that enables the brushless sensorless motor to operate stably even when its rotational speed is changed.

In order to achieve the above object, according to the present invention, there is provided a motor control apparatus comprising: a servo circuit for outputting a pulse width modulation signal; a low-pass filter for receiving the pulse width modulation signal outputted by the servo circuit as an input; a driver circuit for receiving an output voltage of the low-pass filter as an input and thereby driving a brushless sensorless motor; and rotational speed changing means for changing rotational speed of the motor by gradually varying a voltage outputted by the driver circuit from a current voltage to a target voltage on input of a control start signal; wherein the servo circuit controls pulse width of the pulse width modulation signal so as to maintain the rotational speed of the motor at a target rotational speed on the basis of an FG pulse signal outputted from the motor, the FG pulse signal representing the rotational speed of the motor by frequency.

With this configuration, on input of the control start signal to change the rotational speed of the motor, the rotational speed changing means in the motor control apparatus according to the present invention changes the rotational speed of the motor by gradually varying the voltage outputted by the driver circuit from the current voltage to the target voltage. Thus, the rotational speed of the motor also changes gradually, and the motor properly generates the FG pulse signal. Therefore, even when the rotational speed is varied greatly, it is possible to properly control the motor on the basis of the FG pulse signal.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a flowchart showing operation of the motor control apparatus of FIG. 1;

FIG. 6 is a waveform diagram showing change in drive voltage when rotational speed of a motor is to be changed in a conventional motor control apparatus; and FIG. 7 is a waveform diagram showing change in the rotational speed of the motor when the drive voltage is changed in a manner as shown in FIG. 6.

DETAILED DESCRIPTION OF PREFERRED EMBODIMENTS

Preferred embodiments of the present invention will next be described with reference to the drawings.

Figure 1:
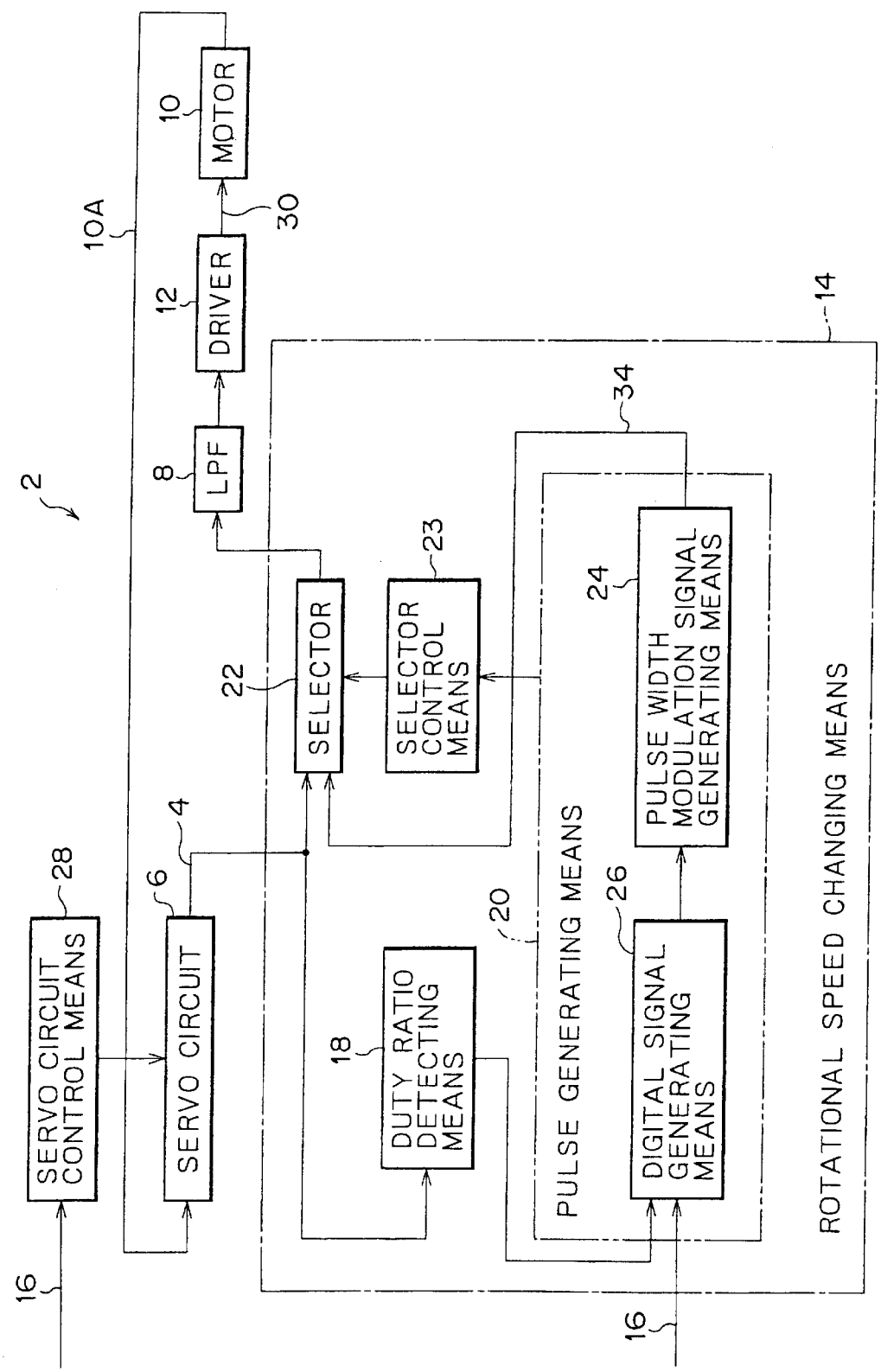
FIG. 1 is a block diagram showing an example of a motor control apparatus according to the present invention.
Figure 2:
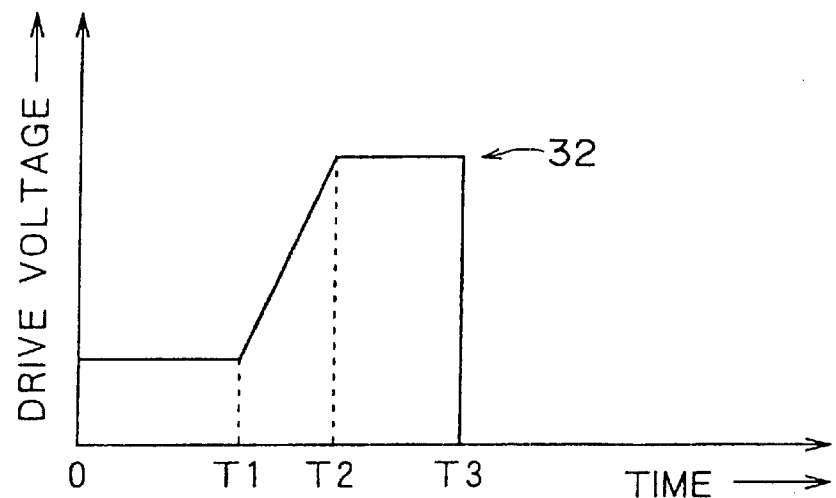
FIG. 2 is a waveform diagram showing change in a voltage for driving a motor in the motor control apparatus of FIG. 1.

FIG. 1 is a block diagram showing an example of a motor control apparatus according to the present invention. FIG. 2 is a waveform diagram showing change in a voltage for driving a motor in the motor control apparatus of FIG. 1. FIG. 3 is a flowchart showing operation of the motor control apparatus of FIG. 1.

The motor control apparatus according to the present embodiment is incorporated in an MD system to control a motor for rotating an MD, for example.

As shown in FIG. 1, the motor control apparatus 2 according to the present embodiment comprises: a servo circuit 6 for outputting a pulse width modulation signal 4; a low-pass filter 8 for receiving the pulse width modulation signal 4 outputted by the servo circuit 6 as an input (the time constant is about 500 μs to 1 ms, for example); and a driver circuit 12 for receiving an output voltage of the low-pass filter 8 as an input and thereby driving a brushless sensorless motor 10 (also referred to simply as a motor 10); wherein the servo circuit 6 controls pulse width (or duty ratio) of the pulse width modulation signal 4 so as to maintain rotational speed of the motor 10 at a target rotational speed on the basis of an FG pulse signal 10A from the motor 10 that represents the rotational speed of the motor 10 by frequency.

The motor control apparatus 2 according to the present embodiment further includes a rotational speed changing means 14. The rotational speed changing means 14 changes the rotational speed of the motor 10 by gradually varying a voltage outputted by the driver circuit 12 from a current voltage to a target voltage on input of a control start signal 16.

More specifically, the rotational speed changing means 14 includes: a duty ratio detecting means 18 for detecting the duty ratio of the pulse width modulation signal 4 outputted by the servo circuit 6; a pulse generating means 20 for generating a second pulse width modulation signal that gradually changes from a current duty ratio detected by the duty ratio detecting means 18 to a target duty ratio corresponding to the target voltage on input of the control start signal 16; a selector means 22 for receiving the pulse width modulation signal 4 outputted by the servo circuit 6 and the second pulse width modulation signal generated by the pulse generating means 20 as inputs, selecting either one of the input signals on the basis of a selection signal, and then supplying the selected input signal to the low-pass filter 8; and a selector control means 23 for supplying the selector means 22 with the selection signal to select the second pulse width modulation signal while the pulse generating means 20 generates the second pulse width modulation signal.

The pulse generating means 20 includes: a pulse width modulation signal generating means 24 for outputting the second pulse width modulation signal 34 having duty ratio corresponding to level of a given digital signal; and a digital signal generating means 26 for generating a digital signal that gradually changes from a value corresponding to the duty ratio detected by the duty ratio detecting means 18 to a value corresponding to the target duty ratio on input of the control start signal 16 and then supplying the generated digital signal to the pulse width modulation signal generating means 24.

In addition, the motor control apparatus 2 according to the present embodiment has a servo circuit control means 28. The servo circuit control means 28 sets the rotational speed of the motor 10 to be targeted by the servo circuit 6 to a rotational speed corresponding to the target voltage during a period from the input of the control start signal 16 to a time when an output voltage of the driver circuit 12 reaches the target voltage.

Operation of the thus configured motor control apparatus 2 will next be described.

During a period during which the MD system does not read information from an MD, for example, the motor 10 is rotated at a low speed. During this period, the control start signal 16 is not inputted to the servo circuit control means 28 and the rotational speed changing means 14. Thus, the servo circuit control means 28 sets a low rotational speed as a rotational speed to be targeted by the servo circuit 6 so that the motor 10 is rotated at a low speed. The selector control means 23 in the rotational speed changing means 14 controls the selector means 22 to select the pulse width modulation signal 4 outputted by the servo circuit 6 and then output the pulse width modulation signal 4 to the low-pass filter 8. The servo circuit 6 controls the pulse width of the pulse width modulation signal 4 to change the rotational speed of the motor 10 to the targeted rotational speed on the basis of an FG pulse signal 10A from the motor 10. Thus, the motor 10 is rotated at the targeted rotational speed.

A drive voltage 30 supplied by the driver circuit 12 to the motor 10 during this period is substantially constant at a low voltage as shown in a period to a time T1 in FIG. 2.

When a control start signal 16 is thereafter inputted to the rotational speed changing means 14 and the servo circuit control means 28 at the time T1 to read information from the MD, for example, the digital signal generating means 26 in the rotational speed changing means 14 generates a digital signal that gradually changes from a value corresponding to the current duty ratio, detected by the duty ratio detecting means 18, of the pulse width modulation signal 4 outputted by the servo circuit 6 to a value corresponding to the target duty ratio. The digital signal generating means 26 determines the target duty ratio from a corresponding relation between the target duty ratio and the target voltage (drive voltage at the time of high-speed rotation). A period of changing the value of the digital signal is about 100 ms to 1 s, for example (a period from the time T1 to a time T2 in FIG. 2).

The pulse width modulation signal generating means 24 outputs the second pulse width modulation signal 34 having duty ratio corresponding to level of the digital signal from the digital signal generating means 26.

In this case, since the pulse width modulation signal generating means 24 begins output of the second pulse width modulation signal 34, the selector control means 23 controls the selector means 22 by outputting a selection signal to select the output signal of the pulse width modulation signal generating means 24.

Thus, the second pulse width modulation signal 34 generated by the pulse width modulation signal generating means 24 is supplied to the low-pass filter 8 via the selector means 22. The low-pass filter 8 smoothes the signal into a voltage corresponding to its pulse width (hence its duty ratio) and then supplies the voltage to the driver circuit 12. The motor 10 is thereby rotated at rotational speed corresponding to the voltage.

Supposing that the digital signal generating means 26 generates a digital signal that increases its value linearly during the period from the time T1 to the time T2, as shown in FIG. 2, the second pulse width modulation signal 34 generated by the pulse width modulation signal generating means 24 linearly widens its pulse width with time. Thus, the drive voltage 30 applied to the motor 10 is linearly raised to the target voltage 32 during the above period, as shown in FIG. 2.

As a result, the rotational speed of the motor 10 gradually increases and reaches the target rotational speed at the time T2, rather than immediately reaching the target rotational speed at the time T1 as in the conventional motor control apparatus.

In the meantime, when the control start signal 16 is inputted to the servo circuit control means 28, the servo circuit control means 28 sets the rotational speed of the motor 10 to be targeted by the servo circuit 6 to a high rotational speed corresponding to the target voltage during the period from the input of the control start signal 16 to a time when the output voltage of the driver circuit 12 reaches the target voltage.

Then, the digital signal generating means 26 stops output of the digital signal at the time T2. As a result, the pulse width modulation signal generating means 24 also stops generating the second pulse width modulation signal 34. Thus, the selector control means 23 controls the selector means 22 to select the signal from the servo circuit 6. The servo circuit 6 therefore controls the rotational speed of the motor 10 to maintain at a substantially constant, high rotational speed after the time T2. In this state, the MD is accessed to read information recorded thereon at high speed.

Then, when the access to the MD is ended, the servo circuit control means 28 sets the rotational speed of the motor 10 to zero, for example, at a time T3. Thus, the drive voltage 30 becomes zero, and in this case, no servo operation is performed in effect and therefore the motor 10 rotates by inertia and gradually decreases its rotational speed.

Operation of the rotational speed changing means 14, especially the pulse generating means 20 will be described in the following in more detail with reference to FIG. 3.

On input of the control start signal 16 as described above, the digital signal generating means 26 sets the target duty ratio corresponding to the target voltage for high-speed rotation on the basis of the target voltage (step S1). The digital signal generating means 26 sets the number of steps taken to reach the target duty ratio (step S2), obtains the current duty ratio from the duty ratio detecting means 18 (step S3), and then begins generating a digital signal (step S4).

The digital signal generating means 26 then adds an increment determined by the number of steps set at the step S2 to the current duty ratio (step S5), and thereby outputs a digital signal having a value corresponding to the resulting duty ratio. The digital signal generating means 26 thereafter determines whether the target duty ratio is reached or not (step S6). The digital signal generating means 26 repeats the steps S5 and S6 in a fixed cycle, for example, until the target duty ratio is reached. When the target duty ratio is reached at the step S6, the digital signal generating means 26 ends digital signal generation (step S7).

As described above, on input of the control start signal 16 to change the rotational speed of the motor 10, the rotational speed changing means 14 in the motor control apparatus 2 according to the present embodiment changes the rotational speed of the motor 10 by gradually varying the voltage outputted by the driver circuit 12 from a current voltage to the target voltage. Thus, the rotational speed of the motor 10 also changes gradually, and the motor 10 properly generates an FG pulse signal. Therefore, even when the rotational speed is varied greatly, it is possible to properly control the motor 10 on the basis of the FG pulse signal.

When the rotational speed of the motor 10 is changed sharply, a great drive current will flow through the driver circuit 12; however, according to the present embodiment, the rotational speed of the motor 10 changes gradually, and therefore change of the rotational speed will not cause a particularly great drive current to flow. Hence, it is also possible to reduce power consumption.

A drive voltage in the period from the time T1 to the time T2 shown in FIG. 2 is obtained when the digital signal generating means 26 sets the number of steps taken to reach the target duty ratio relatively high. Therefore, the drive voltage rises continuously.

Figure 4:
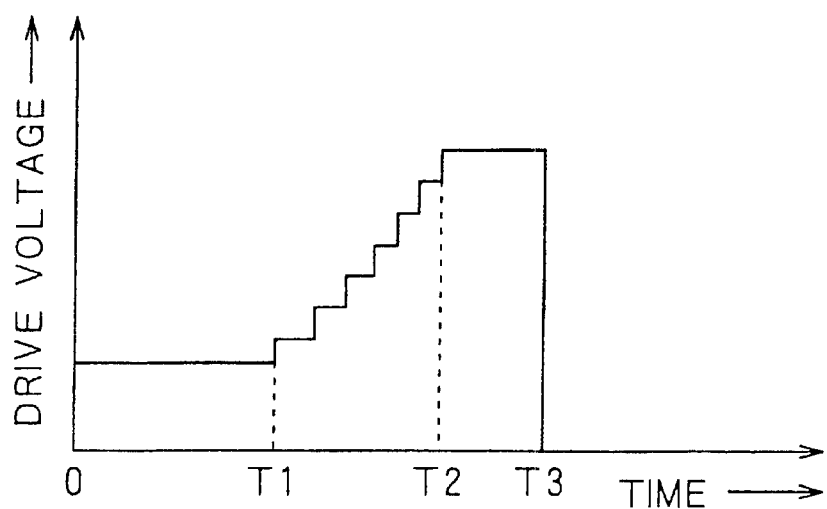
FIG. 4 is a waveform diagram showing change in a voltage for driving the motor in the motor control apparatus of FIG. 1.

However, the number of steps may be set at a relatively low value, and in that case, the drive voltage will rise stepwise. Also, in that case, the cycle of repeating the steps S5 and S6 in FIG. 3 may be changed; for example, if the cycle is gradually shortened, the drive voltage changes in a manner as shown by a waveform in FIG. 4.

Figure 5:
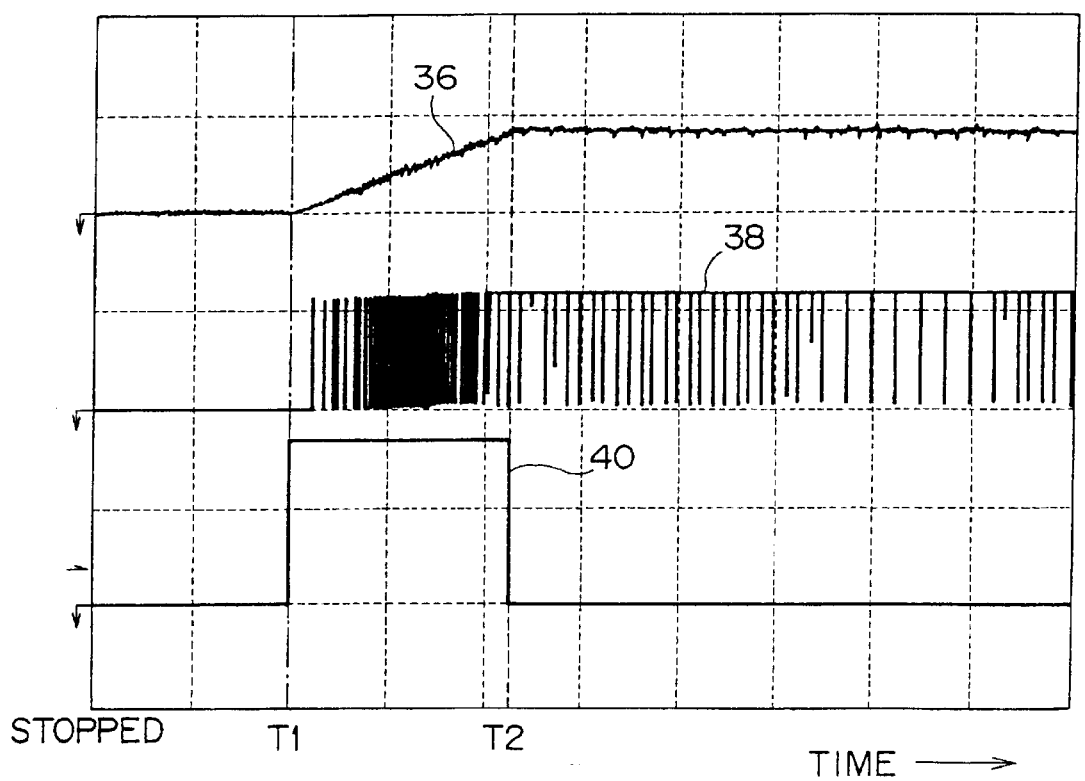
FIG. 5 is a graph showing results of drive voltage measurement and the like made on a prototype of the motor control apparatus according to the present invention.

FIG. 5 is a graph showing results of drive voltage measurement and the like made on a prototype of the motor control apparatus 2 according to the present embodiment. In the figure, the axis of abscissas denotes time and the axis of ordinates denotes voltage. A waveform 36 represents the drive voltage 30 applied to the motor 10; a waveform 38 represents a pulse width modulation signal outputted by the selector means 22; and a waveform 40 represents a signal corresponding to the selection signal supplied by the selector control means 23 to the selector means 22.

The control start signal 16 is inputted at the time T1, and then the duty ratio of the pulse width modulation signal outputted by the selector means 22 begins changing and the drive voltage is gradually raised at a substantially constant rate. The drive voltage is substantially constant after the time T2.

According to the present embodiment, the motor control apparatus 2 is incorporated in the MD system; however, it is of course possible to obtain the same effects by incorporating the motor control apparatus 2 into a DVD system.

In addition, the present invention is effective not only in changing the rotational speed of the motor 10 from low speed to high speed but also in changing the rotational speed of the motor 10 from high speed to low speed. While sharp change at the time of deceleration may be avoided by setting the drive voltage to zero and allowing the motor 10 to rotate by inertia, the present invention increases freedom of deceleration method selection. Incidentally, when the rotational speed is to be decreased, the increment added at the step S5 in FIG. 3 may be set to be a minus increment, for example.

There are cases in which the rotational speed of the motor 10 is controlled such that a constant speed is obtained whether at an inner radius or at an outer radius of the MD, for example (Constant Linear Velocity servo) and the rotational speed of the motor 10 is controlled such that the angular velocity becomes constant. The present invention is effective in both cases.

While a preferred embodiment of the present invention has been described using specific terms, such description is for illustrative purposes only, and it is to be understood that changes and variations may be made without departing from the spirit or scope of the following claims.

What is claimed is:

1. A motor control apparatus comprising:
    a servo circuit for outputting a pulse width modulation signal;
    a low-pass filter for receiving said pulse width modulation signal outputted by said servo circuit as an input;
    a driver circuit for receiving an output voltage of said low-pass filter as an input and thereby driving a brushless sensorless motor; and
    rotational speed changing means for changing rotational speed of said motor by gradually varying a voltage outputted by said driver circuit from a current voltage to a target voltage on input of a control start signal;
    wherein said servo circuit controls pulse width of said pulse width modulation signal so as to maintain the rotational speed of said motor at a target rotational speed on the basis of an FG pulse signal outputted by said motor, the FG pulse signal representing the rotational speed of said motor by frequency.

2. A motor control apparatus as claimed in claim 1, wherein said rotational speed changing means includes:
    duty ratio detecting means for detecting duty ratio of said pulse width modulation signal outputted by said servo circuit;
    pulse generating means for generating a second pulse width modulation signal that gradually changes from a current duty ratio detected by said duty ratio detecting means to a target duty ratio corresponding to said target voltage on input of said control start signal;
    selector means for receiving said pulse width modulation signal outputted by said servo circuit and said second pulse width modulation signal generated by said pulse generating means as inputs, selecting either one of said input signals on the basis of a selection signal, and then supplying the selected input signal to said low-pass filter; and selector control means for supplying said selector means with said selection signal to select said second pulse width modulation signal while said pulse generating means generates said second pulse width modulation signal.

3. A motor control apparatus as claimed in claim 2, wherein said pulse generating means generates said second pulse width modulation signal whose duty ratio changes continuously or substantially continuously.

4. A motor control apparatus as claimed in claim 2, wherein said pulse generating means generates said second pulse width modulation signal whose duty ratio changes stepwise.

5. A motor control apparatus as claimed in claim 2, wherein said pulse generating means includes:

pulse width modulation signal generating means for outputting said second pulse width modulation signal having duty ratio corresponding to level of a given digital signal; and digital signal generating means for generating a digital signal that gradually changes from a value corresponding to the current duty ratio detected by said duty ratio detecting means to a value corresponding to said target duty ratio on input of said control start signal and then supplying the generated digital signal to said pulse width modulation signal generating means.

6. A motor control apparatus as claimed in claim 1, further including servo circuit control means for setting the rotational speed of said motor to be targeted by said servo circuit to a rotational speed corresponding to said target voltage during a period from the input of said control start signal to said rotational speed changing means to a time when an output voltage of said driver circuit reaches said target voltage.

\* \* \* \* \*